(12) United States Patent
Grier et al.

(10) Patent No.: US 7,133,203 B2
(45) Date of Patent: Nov. 7, 2006

(54) APPARATUS FOR APPLYING OPTICAL GRADIENT FORCES

(75) Inventors: David G. Grier, Chicago, IL (US); Eric R. Dufresne, Chicago, IL (US)

(73) Assignee: Arch Development Corporation, Chicago, IL (US)

( * ) Notice: Subject to any disclaimer, the term of this patent is extended or adjusted under 35 U.S.C. 154(b) by 0 days.

(21) Appl. No.: 10/310,704

(22) Filed: Dec. 5, 2002

(65) Prior Publication Data
US 2003/0086175 A1 May 8, 2003

Related U.S. Application Data

(63) Continuation of application No. 09/680,898, filed on Oct. 6, 2000, now abandoned.

(51) Int. Cl.
*G02B 27/44* (2006.01)

(52) U.S. Cl. .................... 359/566; 359/15; 349/201; 349/202

(58) Field of Classification Search ........... 359/566, 359/9, 15, 573, 16, 19, 20, 27, 558, 569, 359/571, 434; 349/201, 202; 250/251
See application file for complete search history.

(56) References Cited

U.S. PATENT DOCUMENTS

| 4,893,886 | A | 1/1990 | Ashkin et al. ............... 359/350 |
| 5,512,745 | A * | 4/1996 | Finer et al. .................. 250/251 |
| 6,055,106 | A | 4/2000 | Grier et al. .................. 359/566 |
| 6,624,940 | B1 * | 9/2003 | Grier et al. .................. 359/566 |

OTHER PUBLICATIONS

E. R. Dufresne, D. G. Grier, 'Optical tweezer arrays and optical substrates created with diffractive optics', Rev. Sci. Instru., vol. 69, No. 5, May 1998, pp. 1974-1977.*

* cited by examiner

*Primary Examiner*—Arnel C. Lavarias
(74) *Attorney, Agent, or Firm*—Jean C. Edwards, Esq.; Akerman Senterfitt

(57) ABSTRACT

A method and apparatus for control of optical trap arrays and formation of particle arrays. The method and apparatus provides a laser and a time variable diffractive optical element to allow dynamic control of optical trap arrays and consequent control of particle arrays and also the ability to manipulate singular objects using a plurality of optical traps.

33 Claims, 9 Drawing Sheets

APPARATUS FOR APPLYING OPTICAL GRADIENT FORCES

This Application is a continuation of U.S. patent application Ser. No. 09/680,898 filed Oct. 6, 2000 now abandoned, which is incorporated herein by reference.

This invention was made with U.S. Government support under Contract No. DMR-9320278 awarded by the National Science Foundation, through the MRSEC Program of the National Science Foundation under Award No. DMR-9400379, and through a GAANN fellowship from the Department of Education. The U.S. Government also has certain rights to the invention pursuant to funding under contracts NSFDMR-978031 and NSFDMR 980595.

The present invention is directed generally to a method and apparatus for control of optical traps. More particularly, the invention is directed to methods and apparati for dynamic control of optical trap arrays and for controllably filling an optical trap array with particles. Such methods and apparati enable the dynamic change of optical trap location, the strength and size of each optical trap and enable controlled adaptation and feedback for use of the optical traps for investigation and manufacturing purposes.

It is known to construct optical tweezers using optical gradient forces from a single beam of light to manipulate the position of a small dielectric particle immersed in a fluid medium whose refractive index is smaller than that of the particle. The optical tweezer technique has been generalized to enable manipulation of reflecting, absorbing and low dielectric constant particles as well.

The current conventional systems therefore can manipulate a single particle by using a single beam of light to generate a single optical trap. To manipulate multiple particles with such systems, multiple beams of light must be employed. The difficulty of creating extended multiple-beam traps using conventional optical tweezer methodology inhibits their use in many potential commercial applications such as the fabrication and manipulation of nanocomposite materials including electronic, photonic and opto-electronic devices, chemical sensor arrays for use in chemical and biological assays, and holographic and computer storage matrices.

It is therefore an object of the invention to provide an improved method and system for establishing a plurality of optical traps.

It is one object of the invention to provide a novel method and apparatus for control of optical traps and small particle arrays.

It is yet another object of the invention to provide an improved method and apparatus for dynamic control of optical traps.

It is still a further object of the invention to provide a novel method and apparatus for sequential formation of optical traps and/or particle arrays.

It is an additional object of the invention to provide an improved method and apparatus to exert dynamic control of size, shape and strength of optical traps.

It is yet a further object of the invention to provide a novel method and apparatus for computer generation of a holographic pattern for dynamic control of optical trap configurations.

It is still another object of the invention to provide an improved method and apparatus for applying a spatial light modulator to a laser beam for dynamic control of optical trap arrays.

It is also an additional object of the invention to provide a novel method and apparatus employing a mechanical device for selective passage of laser beams for time varying formation of particular optical trap arrays.

It is still a further object of the invention to provide an improved method and apparatus for enhanced particle flow into optical traps and selective output of different particles for optical trapping.

It is also another object of the invention to provide a new method and apparatus for inspection and manipulation of biological media using a controlled array of optical traps.

It is another object of the invention to provide a novel method and system for using a single beam of light with diffractive optics for forming a configuration of light beams for establishing a plurality of optical traps.

It is an additional object of the invention to provide a novel method and apparatus for using holograms for generating an optical gradient field for controlling a plurality of particles or other optical media.

It is a further object of the invention to provide an improved method and system for establishing a plurality of optical traps for a variety of commercial applications relating to manipulation of small particles such as in photonic circuit manufacturing, nanocomposite material applications, fabrication of electronic components, opto-electronic devices, chemical and biological sensor arrays, assembly of holographic data storage matrices, facilitation of combinatorial chemistry applications, promotion of colloidal self-assembly, and the manipulation of biological materials.

It is still another object of the invention to provide an improved method and system for constructing a temporally and spatially varying configuration of optical gradient fields for commercial applications.

It is also an object of the invention to provide a novel method and system for using one or more laser beams in conjunction with one or more diffractive optical elements for constructing a selectable time varying and/or particular spatial array of optical traps for manipulating a dielectric material.

It is yet a further object of the invention to provide an improved method and system using a single input laser beam, a diffractive optical element, and a diverging and/or converging lens to form a static or dynamic optical trap.

It is still an additional object of the invention to provide a novel method and system for constructing an optical trap array which is directly observable by a user.

It is also a further object of the invention to provide an improved method and system employing a laser beam input to a diffractive optical element with a beam scanning system enabling scanning of an array of optical traps for various commercial applications.

It is in addition another object of the invention to provide a novel method and apparatus for constructing an optical trap configuration using a laser beam, a diffractive optical element and a diverging or converging optical system to form the trap configuration at a selectable location relative to an objective lens focal plane.

It is still another object of the invention to provide an improved method and apparatus for using a laser beam and an obliquely positioned diffractive optical element to filter out any undiffracted beam for efficient utilization of only a diffracted optical beam in constructing an optical trap arrangement.

It is yet another object of the invention to provide a novel method and apparatus for using a laser beam input to a diffractive optical element to generate at least a two-dimensional arrangement of optical traps out of the focal plane of an objective lens.

It is also yet another object of the invention to provide an improved method and system for employing a light beam and diffractive optics in conjunction with a plurality of telescope lenses to scan an optical trap array.

It is yet an additional object of the invention to provide a novel method and system for establishing an array of optical traps using a single light beam input to a diffractive optical element and an optical system for controllably scanning the optical trap array such that small amplitude oscillatory displacements are applied to dynamically stiffen the optical traps.

It is another object of the invention to provide a novel method for creating multiple independently steered optical traps using a time-dependent addressable phase-shifting medium (such as a liquid crystal phase shifting array) as a diffractive optical element.

It is a further object of the invention to provide a novel method for creating time-dependent optical gradient fields for the segregation of microscopic particles.

It is yet another object of the invention to provide a novel method for manipulating a plurality of biological objects including the crystallization of proteins.

Other objects, features and advantages of the present invention will be readily apparent from the following description of the preferred embodiments thereof, taken in conjunction with the accompanying drawings described below wherein like elements have like numerals throughout.

DETAILED DESCRIPTION OF THE PREFERRED EMBODIMENTS

Figure 1:
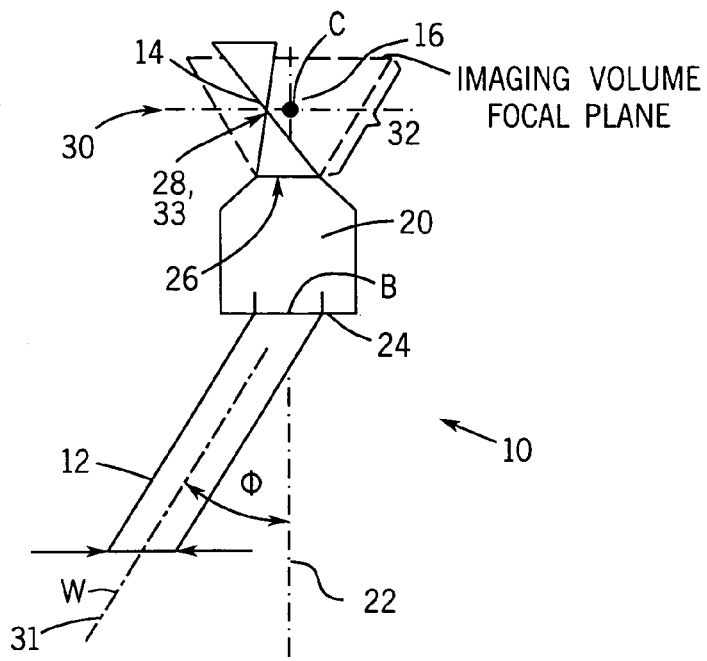
FIG. 1 illustrates a prior art method and system for a single optical tweezer.
Figure 2:
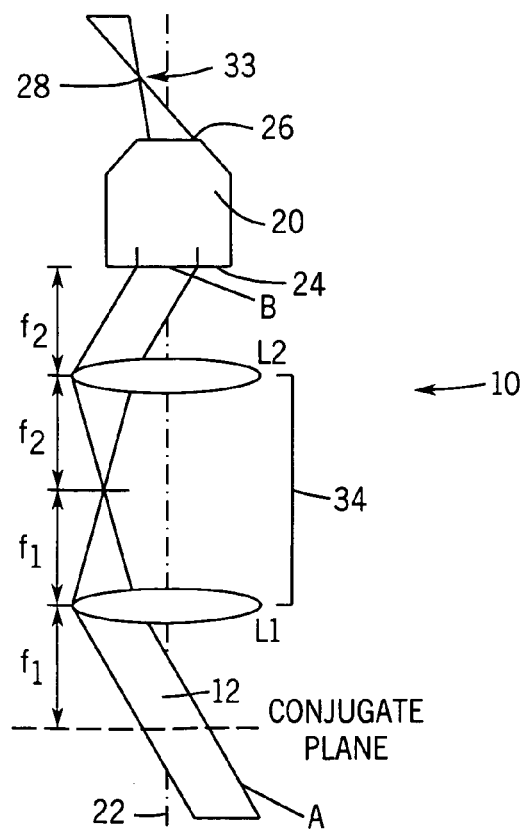
FIG. 2 illustrates a prior art method and system for a single, steerable optical tweezer.

In order to best understand the improvement of the invention, FIGS. 1 and 2 illustrate several prior art methods and systems. These systems will first be reviewed, and then the invention will be described in terms of the preferred embodiment examples of FIGS. 3–7A and 7B. In prior art optical tweezer system 10 of FIG. 1, optical gradient forces arise from use of a single beam of light 12 to controllably manipulate a small dielectric particle 14 dispersed in a medium 16 whose index of refraction, $n_m$, is smaller than that of the particle 14. The nature of the optical gradient forces is well known, and also it is well understood that the principle has been generalized to allow manipulation of reflecting, absorbing and low dielectric constant particles as well. Any of these techniques can be implemented in the context of the invention described hereinafter and will be encompassed by use of the terminology optical tweezer, optical trap and optical gradient force trap hereinafter.

The optical tweezer system 10 is applied by using a light beam 12 (such as a laser beam) capable of applying the necessary forces needed to carry out the optical trapping effect needed to manipulate a particle. The objective of a conventional form of the optical tweezer 10 is to project one or more shaped beams of light into the center of a back aperture 24 of a converging optical element (such as an objective lens 20). As noted in FIG. 1 the light beam 12 has a width "w" and having an input angle Ø relative to an optical axis 22. The light beam 12 is input to a back aperture 24 of the objective lens 20 and output from a front aperture 26 substantially converging to a focal point 28 in focal plane 30 of imaging volume 32 with the focal point 28 coinciding with an optical trap 33. In general, any focusing optical system can form the basis for the optical tweezer system 10.

In the case of the light beam 12 being a collimated laser beam and having its axis coincident with the optical axis 22, the light beam 12 enters the back aperture 24 of the objective lens 20 and is brought to a focus in the imaging volume 32 at the center point c of the objective lens focal plane 30. When the axis of the light beam 12 is displaced by the angle Ø with respect to the optical axis 22, beam axis 31 and the optical axis 22 coincide at the center point B of the back aperture 24. This displacement enables translation of the optical trap across the field of view by an amount that depends on the angular magnification of the objective lens 20. The two variables, angular displacement Ø and varying convergence of the light beam 12, can be used to form the optical trap at selected positions within the imaging volume 32. A multiple number of the optical traps 33 can be arranged in different locations provided that multiple beams of light 12 are applied to the back aperture 24 at the different angles Ø and with differing degrees of collimation.

In order to carry out optical trapping in three dimensions, optical gradient forces created on the particle to be trapped must exceed other radiation pressures arising from light scattering and absorption. In general this necessitates having the wave front of the light beam 12 to have an appropriate shape at the back aperture 24. For example, for a Gaussian $TEM_{00}$ input laser beam, the beam diameter w should substantially coincide with the diameter of the back aperture 24. For more general beam profiles (such as Gauss-Laguerre) comparable conditions can be formulated.

In another prior art system in FIG. 2, the optical tweezer system 10 can translate the optical trap 33 across the field of view of the objective lens 20. A telescope 34 is constructed of lenses L1 and L2 which establishes a point A which is optically conjugate to the center point B in the prior art system of FIG. 1. In the system of FIG. 2 the light beam 12 passing through the point A also passes through the point B and thus meets the basic requirements for performing as the optical tweezer system 10. The degree of collimation is preserved by positioning the lenses L1 and L2 as shown in FIG. 2 to optimize the transfer properties of the telescope 34. In addition, the magnification of the telescope 34 can be chosen to optimize angular displacement of the light beam 12 and its width w in the plane of the back aperture 24 of the objective lens 20. As stated hereinbefore, in general several of the light beams 12 can be used to form several associated optical traps. Such multiple beams 12 can be created from multiple independent input beams or from a single beam manipulated by conventional reflective and/or refractive optical elements.

Figure 3:
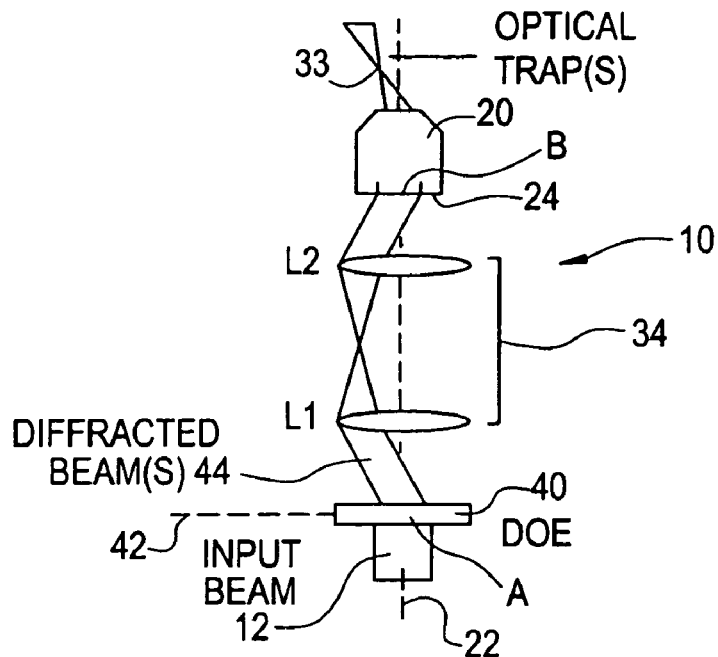
FIG. 3 illustrates a method and system using a diffractive optical element.

In one preferred embodiment of the invention shown in FIG. 3, arbitrary arrays of optical traps can be formed. A diffractive optical element 40 is disposed substantially in a plane 42 conjugate to back aperture 24 of the objective lens 20. Note that only a single diffracted output beam 44 is shown for clarity, but it should be understood that a plurality of such beams 44 can be created by the diffractive optical element 40. The input light beam 12 incident on the diffractive optical element 40 is split into a pattern of the output beam 44 characteristic of the nature of the diffractive optical element 40, each of which emanates from the point A. Thus the output beams 44 also pass through the point B as a consequence of the downstream optical elements described hereinbefore.

The diffractive optical element 40 of FIG. 3 is shown as being normal to the input light beam 12, but many other arrangements are possible. For example, in FIG. 4 the light beam 12 arrives at an oblique angle β relative to the optic axis 22 and not at a normal to the diffractive optical element 40. In this embodiment, the diffracted beams 44 emanating from point A will form optical traps 50 in focal plane 52 of the imaging volume 32 (seen best in FIG. 1). In this arrangement of the optical tweezer system 10 an undiffracted portion 54 of the input light beam 12 can be removed from the optical tweezer system 10. This configuration thus enables processing less background light and improves efficiency and effectiveness of forming optical traps.

The diffractive optical element 40 can include computer generated holograms which split the input light beam 12 into a preselected desired pattern. Combining such holograms with the remainder of the optical elements in FIGS. 3 and 4 enables creation of arbitrary arrays in which the diffractive optical element 40 is used to shape the wavefront of each diffracted beam independently. Therefore, the optical traps 50 can be disposed not only in the focal plane 52 of the objective lens 20, but also out of the focal plane 52 to form a three-dimensional arrangement of the optical traps 50.

Figure 4:
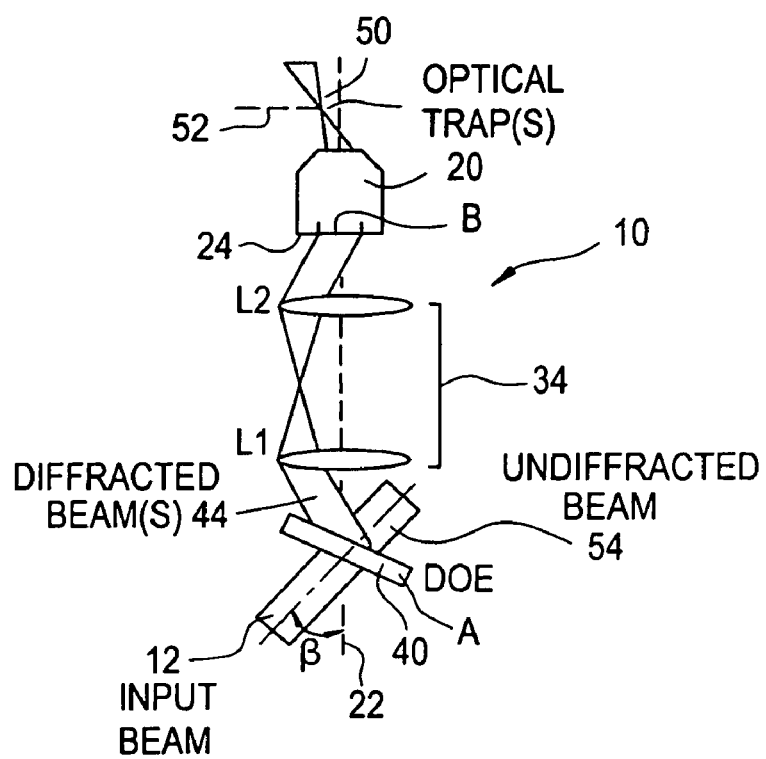
FIG. 4 illustrates another method and system using a tilted optical element relative to an input light beam.

In the optical tweezer system 10 of FIGS. 3 and 4, also included is a focusing optical element, such as the objective lens 20 (or other like functionally equivalent optical device, such as a Fresnel lens) to converge the diffracted beam 44 to form the optical traps 50. Further, the telescope 34, or other equivalent transfer optics, creates a point A conjugate to the center point B of the previous back aperture 24. The diffractive optical element 40 is placed in a plane containing point A.

In another form of the invention, arbitrary arrays of the optical traps 50 can be created without use of the telescope 34. In such an embodiment the diffractive optical element 40 can be placed directly in the plane containing point B.

In the optical tweezer system 10 either static or time dependent diffractive optical elements 40 can be used. For a dynamic, or time dependent version, one can create time changing arrays of the optical traps 50 which can be part of a system utilizing such a feature. In addition, these dynamic optical elements 40 can be used to actively move particles and matrix media relative to one another. For example, the diffractive optical element 40 can be a liquid crystal phase array undergoing changes imprinted with computer-generated holographic patterns.

Figure 5:
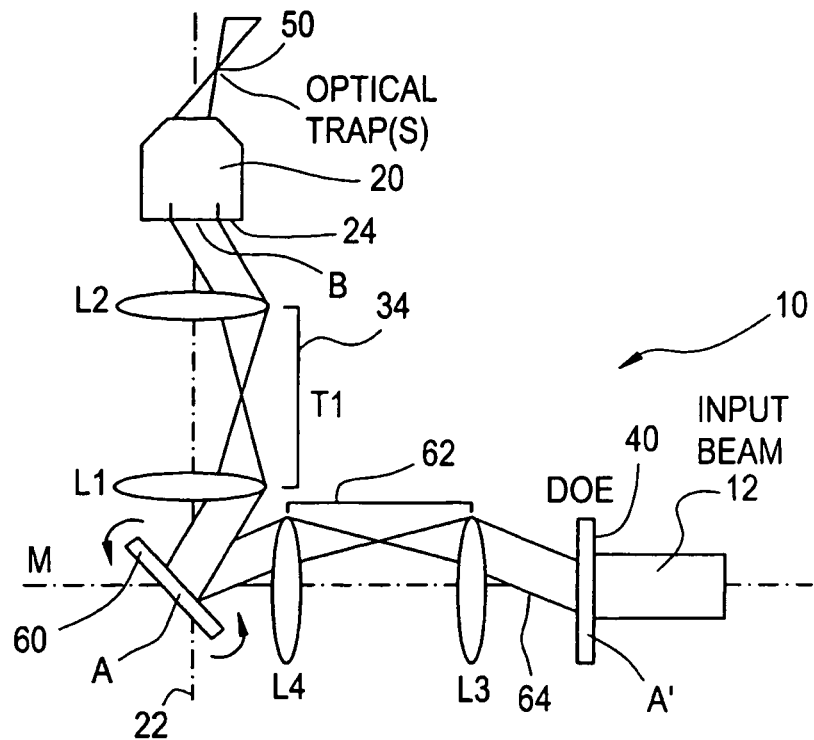
FIG. 5 illustrates a continuously translatable optical tweezer (trap) array using a diffractive optical element.

In another embodiment illustrated in FIG. 5, a system can be constructed to carry out continuous translation of the optical tweezer trap 50. A gimbal mounted mirror 60 is placed with its center of rotation at point A. The light beam 12 is incident on the surface of the mirror 60 and has its axis passing through point A and will be projected to the back aperture 24. Tilting of the mirror 60 causes a change of the angle of incidence of the light beam 12 relative to the mirror 60, and this feature can be used to translate the resulting optical trap 50. A second telescope 62 is formed from lenses L3 and L4 which creates a point A' which is conjugate to point A. The diffractive optical element 40 placed at point A' now creates a pattern of diffracted beams 64, each of which passes through point A to form one of the tweezer traps 50 in an array of the optical tweezers system 10.

In operation of the embodiment of FIG. 5, the mirror 60 translates the entire tweezer array as a unit. This methodology is useful for precisely aligning the optical tweezer array with a stationary substrate to dynamically stiffen the optical trap 50 through small-amplitude rapid oscillatory displacements, as well as for any application requiring a general translation capability.

The array of the optical traps 50 also can be translated vertically relative to the sample stage (not shown) by moving the sample stage or by adjusting the telescope 34. In addition, the optical tweezer array can also be translated laterally relative to the sample by moving the sample stage. This feature would be particularly useful for large scale movement beyond the range of the objective lens field of view.

Figure 6:
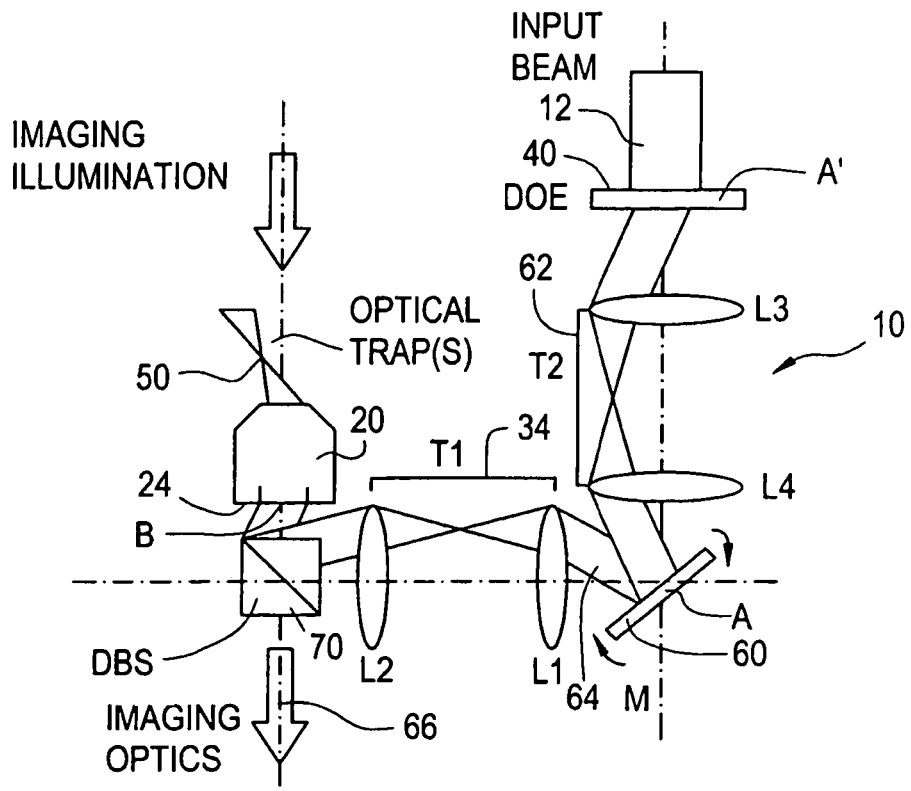
FIG. 6 illustrates a method and system for manipulating particles using an optical tweezer array while also forming an image for viewing the optical trap array.

In another form of the invention shown in FIG. 6 the optical system is arranged to permit viewing images of particles trapped by the optical tweezers 10. A dichroic beamsplitter 70, or other equivalent optical beamsplitter, is inserted between the objective lens 20 and the optical train of the optical tweezer system 10. In the illustrated embodiment the beamsplitter 70 selectively reflects the wavelength of light used to form the optical tweezer array and transmits other wavelengths. Thus, the light beam 12 used to form the optical traps 50 is transmitted to the back aperture 24 with high efficiency while light beam 66 used to form images can pass through to imaging optics (not shown).

Figure 7A:
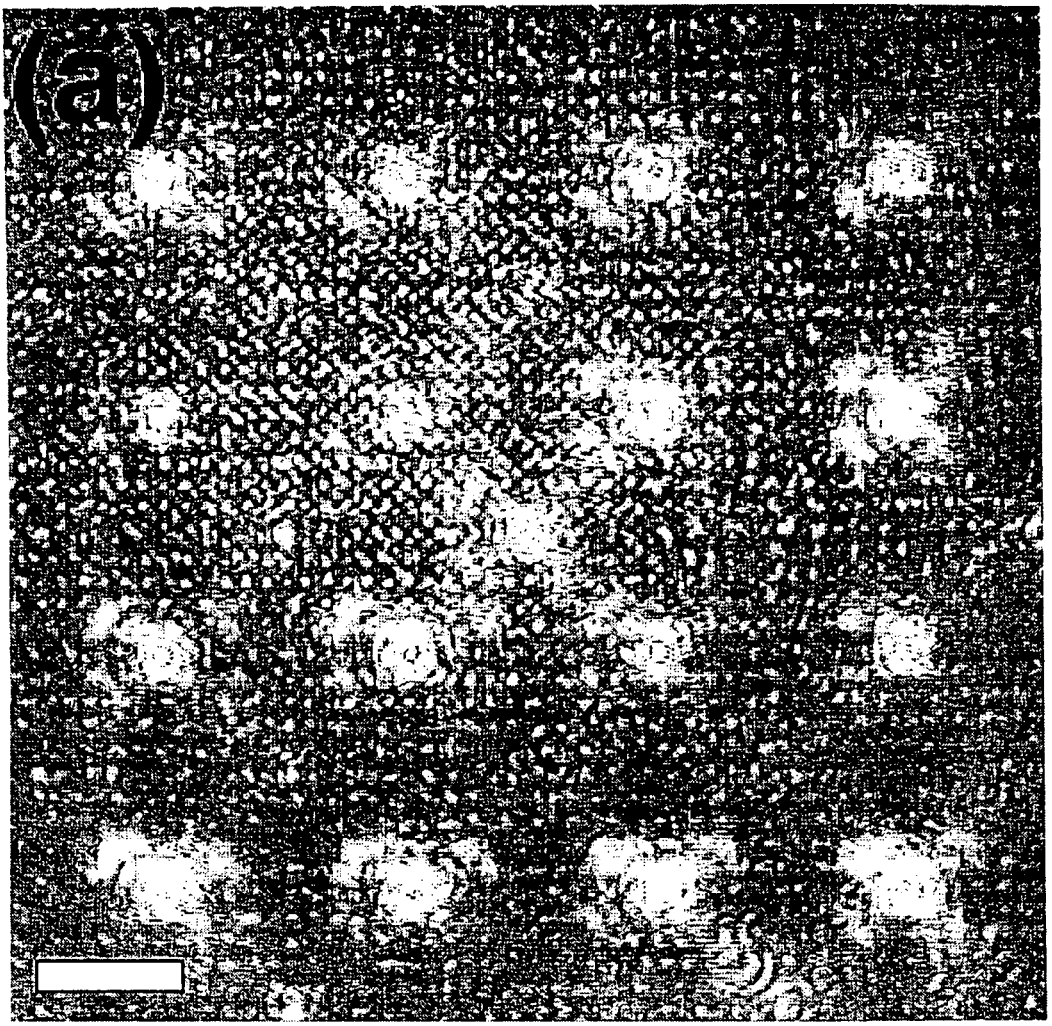
FIG. 7A illustrates an image of a four by four array of optical tweezers (traps) using the optical system of FIG. 6.
Figure 7B:
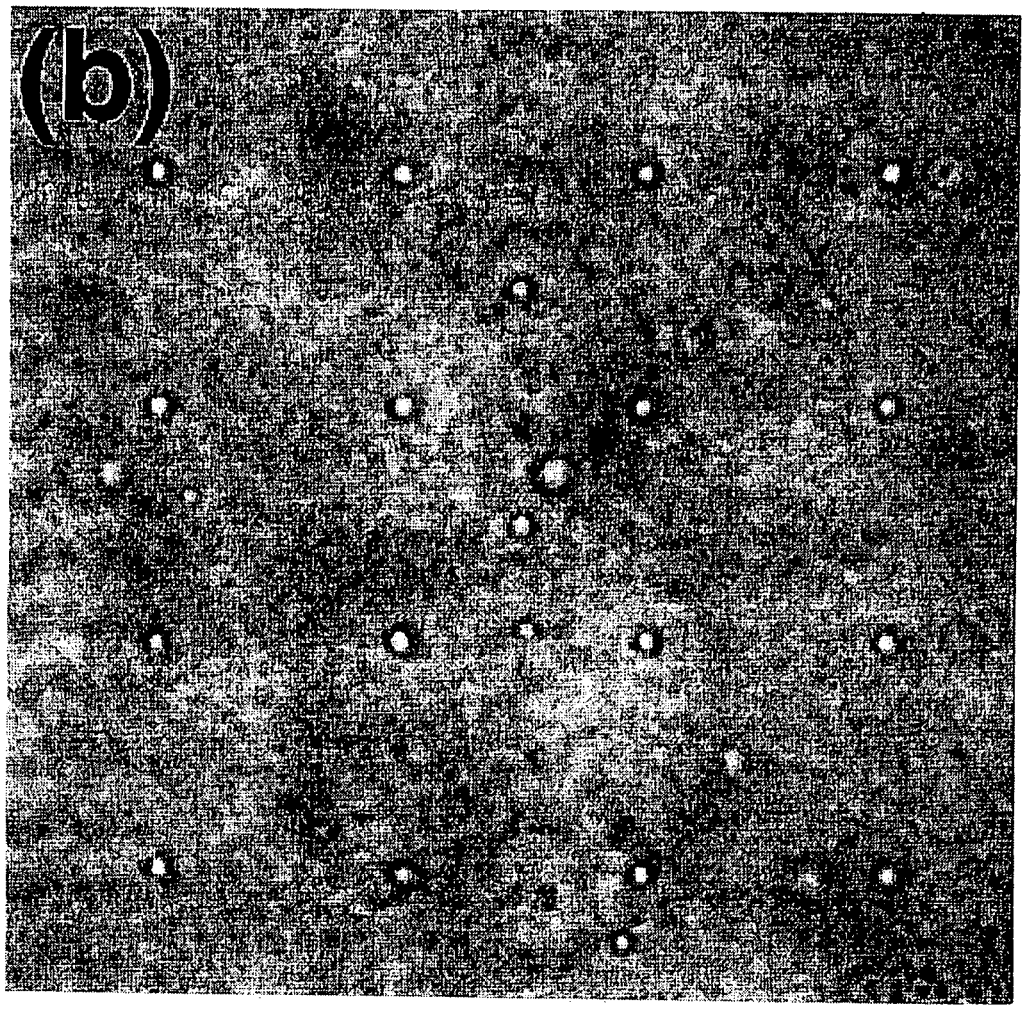
FIG. 7B illustrates an image of one micrometer diameter silica spheres suspended in water by the optical tweezers of FIG. 7A immediately after the trapping illumination has been extinguished, but before the spheres have diffused away.

An illustration of an application of the invention is shown in FIGS. 7A and 7B. The diffractive optical element 40 is designed to interact with the single light beam 12 to create a 4×4 array of collimated beams. A 100 mW frequency doubled diode-pumped Nd:YAG laser operating at 532 nm provides a Gaussian $TEM_{00}$ form for the light beam 12. In FIG. 7A the field of view is illuminated in part by laser light backscattered by sixteen silica spheres trapped in the array's sixteen primary optical tweezers 10. The 1 µm diameter spheres are dispersed in water and placed in a sample volume between a glass microscope slide and a 170 µm thick glass coverslip. The tweezer array is projected upward through the coverslip and is positioned in a plane 8 µm above the coverslip and more than 20 µm below the upper microscope slide. The silica spheres are stably trapped in three-dimensions in each of the sixteen optical tweezers 10.

In FIG. 7B is shown the optically-organized arrangement of spheres 1/30 second after the optical tweezers 10 (traps) were extinguished but before the spheres had time to diffuse away from the trap site.

Adaptive Tweezer Mode

In other forms of the invention the basic optical trap embodiment described hereinbefore can be used in various useful methodologies. Furthermore, other embodiments include apparati and systems which can be constructed to apply these methods to enhance operation and use of the optical traps. In particular, the optical traps can be controlled and modified, and various embodiments employing these features are described hereinafter.

A variety of new uses and applications of optical traps can arise from time varying construction and dynamic change of optical trap configuration. In one form of the invention an array of optical traps can be advantageously manipulated in the manner shown in FIG. 8. In optical system 100, diffractive optical element 102 splits collimated laser beam 104 into several (two or more) laser beams 106 and 108. Each of the several laser beams 106 and 108 are transferred into a separate optical trap in an object plane 118. Each of these several laser beams 106, 108 are transferred to back aperture 110 of the objective lens 112 by action of a conventional optical arrangement, such as the telescope formed by lenses 114 and 116. The objective lens 112 focuses each of these several beams 106, 108 into a separate optical trap 132 in the object plane 118. In a preferred form of the invention a knife edge 120 is disposed to be movable into the path of the several laser beams 106, 108, thereby enabling selective blocking of any selected one(s) of the several laser beams 106, 108 to selectively prevent formation of a portion of the optical traps 132. Such a methodology and structure enables construction of any desired array of the optical traps 132 by use of appropriately designed knife edges or apertured knife edge structure and like such structures.

An illustration of the use of such optical trap control methodology is shown in FIG. 9 wherein the optical traps 132 are formed by a holographic form of diffractive optical element 112. The movable knife edge 120 of FIG. 8 can block all but one line 124 of the optical traps 132. By systematically moving the knife edge 120, each of the lines 124 can be established, and this enables systematic filling of the optical traps 132 with particles 126. This methodology allows filling of the optical traps 132 with a variety of different types of the particles 126 and also avoids the typical problem of the particles 126 tending to fill preferentially the outer portions of an array of the optical traps 132. Such preferential filling can therefore block filling of the inner optical traps 132. This controlled formation of the optical traps 132 also permits precision formation and change of optical trap arrangements.

Figure 8:
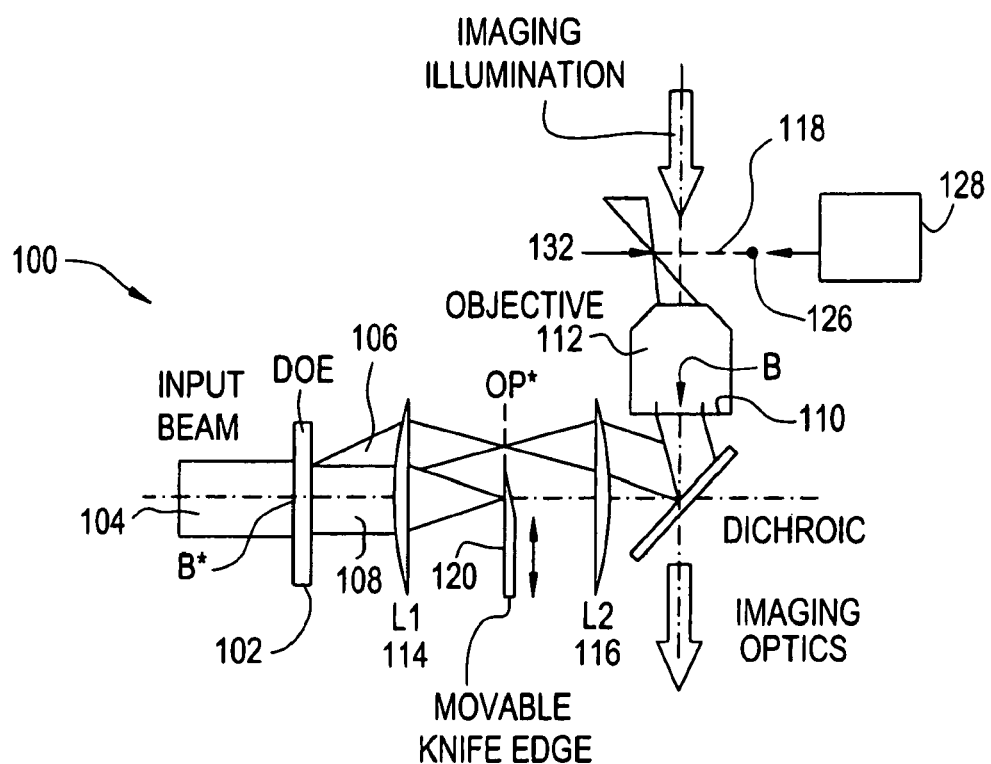
FIG. 8 illustrates a holographic optical trap system including a movable knife edge feature.
Figure 9B:
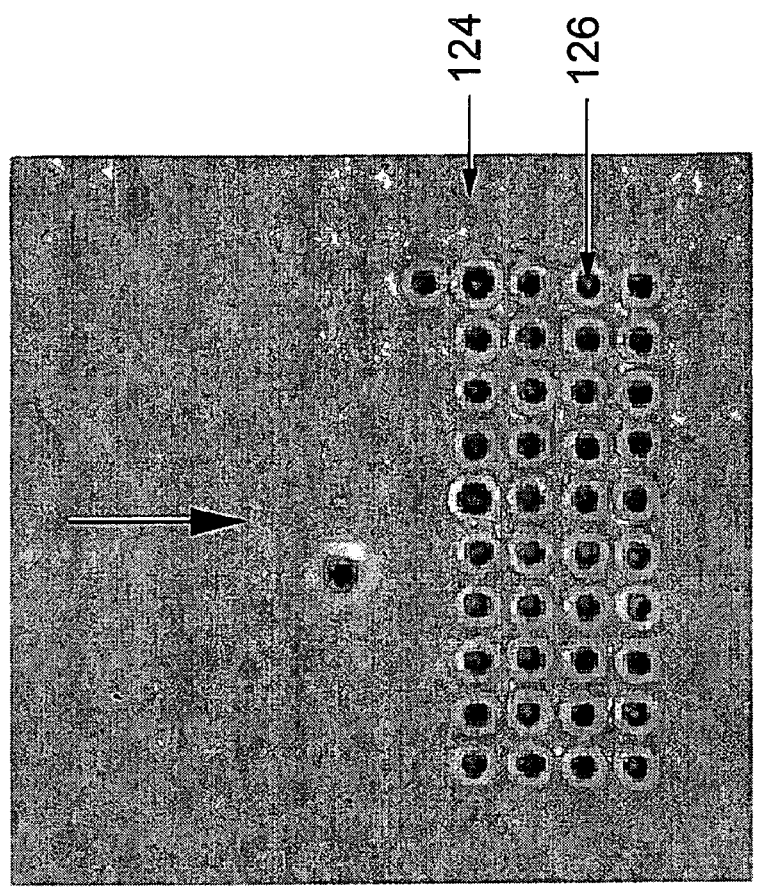
FIG. 9B illustrates optical traps with a focus about 2 microns above the glass and the fifth row of optical traps is exposed to a flow of particles.
Figure 9A:
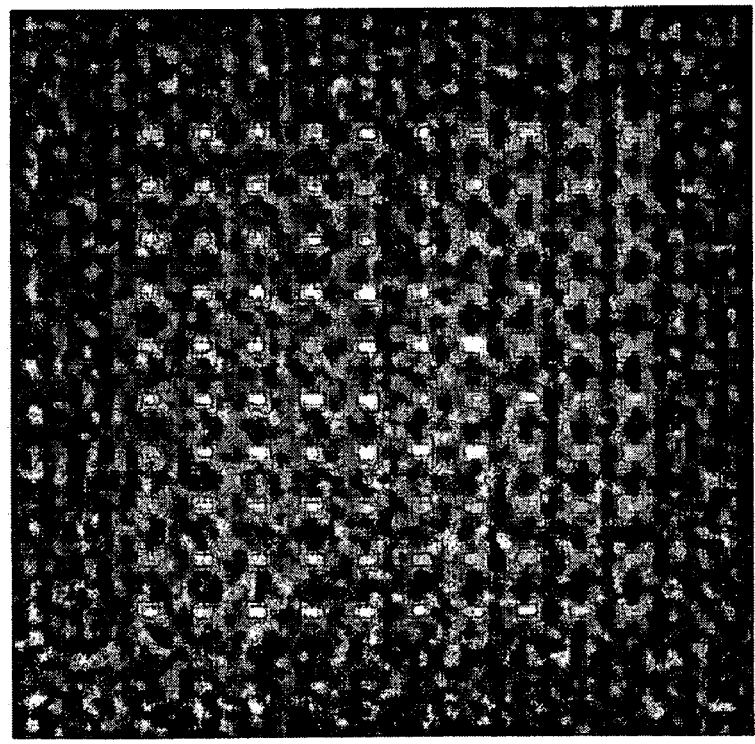
FIG. 9A illustrates a 10×10 array of optical traps formed on a glass-water interface.
Figure 9D:
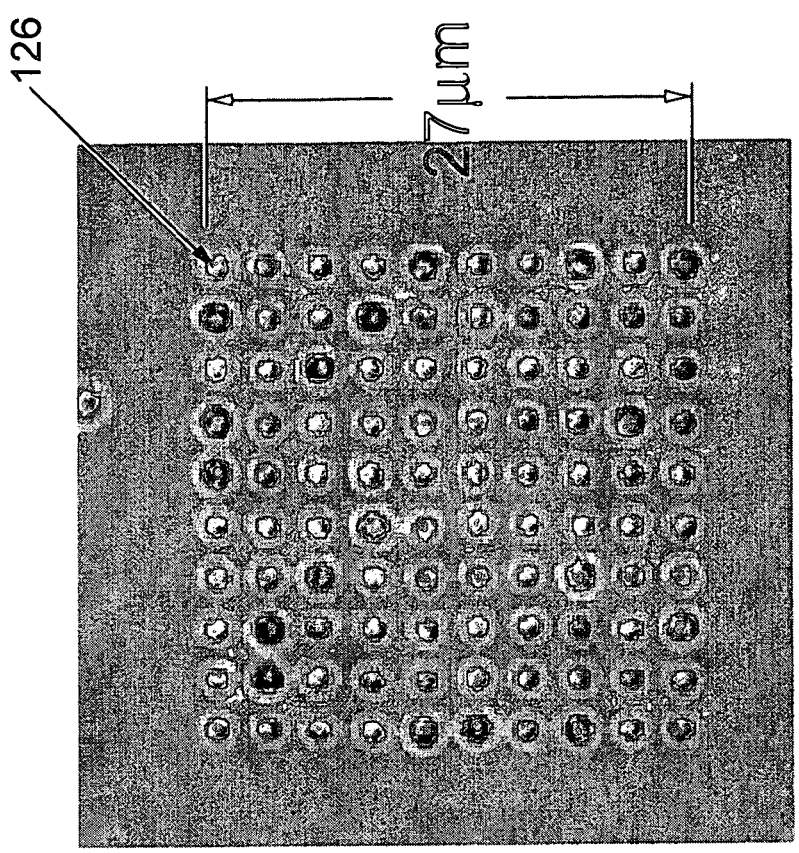
FIG. 9C illustrates further filling of particles compared to FIG. 9B with filling of the eighth row of the optical traps and FIG. 9D illustrates a completely filled pattern of the optical traps.
Figure 9C:
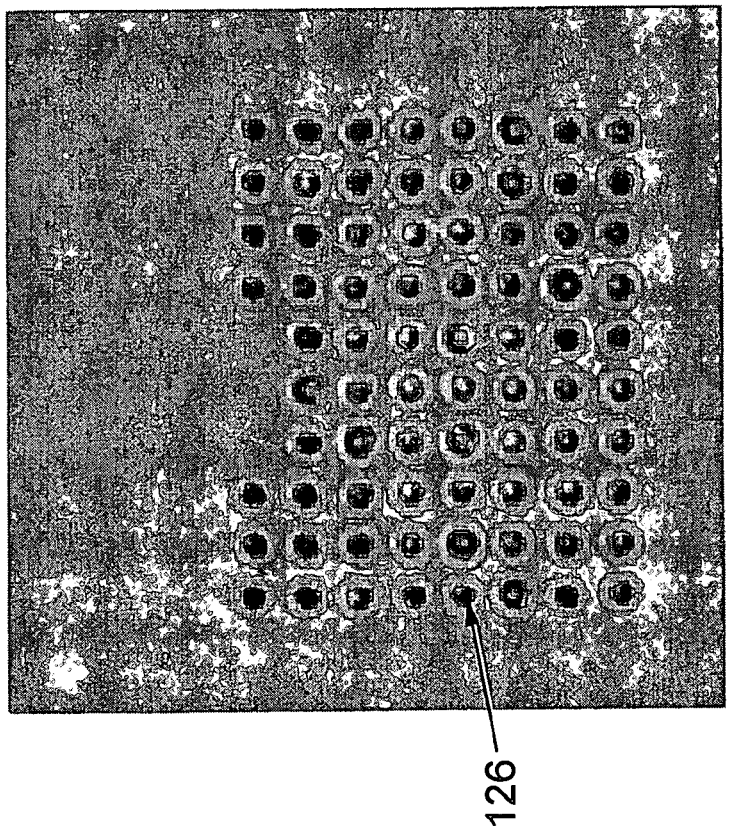

In addition to exerting detailed control over filling of an array of the optical traps 132, devices can be provided to accelerate filling of the optical traps 132. For example, in FIG. 8 is shown a functional block 128 indicative of a device to (1) output selected particles 126 (see FIG. 9), (2) apply the particles 126 under pressure differential (though electrophoresis or electro-osmosis), (3) apply a temperature gradient and (4) translate the entire optical trap array through a suspension containing the particles 126 in a manner like a fishing net. Experimentation has determined the particles 126 can, for example, be filled into the optical traps 132 starting with a particle concentration of about $10^{-4} \mu m^{-3}$ and a reasonable flow rate of about 100 μm/sec to fill one row of the line 124 or an array pattern in about one minute of time. A fully developed array of the particles 126 can be made permanent by transferring the array onto a substrate or by gelling the fluid which is suspending the particles 126. Such a procedure also can allow construction of a large variety of different particle arrays and coupled arrays of the particles 126. Using the previously-described characteristics and functionalities of the optical traps 132, each of the particles 126 can also be further interrogated, imaged and manipulated for operational uses and investigative purposes.

In yet another form of the invention the optical traps 132 can be dynamically changed responsive to a specific optical requirement. The optical requirement can be effected by use of a computer program with desired instructional information such that one or more of the optical traps 132 can be used to modify, remove, or add particles at various optical trap sites or allow various manipulations of a single object. Further, one or more of the optical traps 132 can be moved and their character changed (such as changing the shape or strength of the trap) for dynamic manipulation of any object, such as a cell of a plant or animal. This can be particularly advantageous when manipulating a delicate structure or when there is need to perform complex manipulations of an object. Heretofore, such objects were handled by a single brute force trap which could cause damage to the object or not provide the degrees of freedom often needed to perform a desired function.

Figure 10:
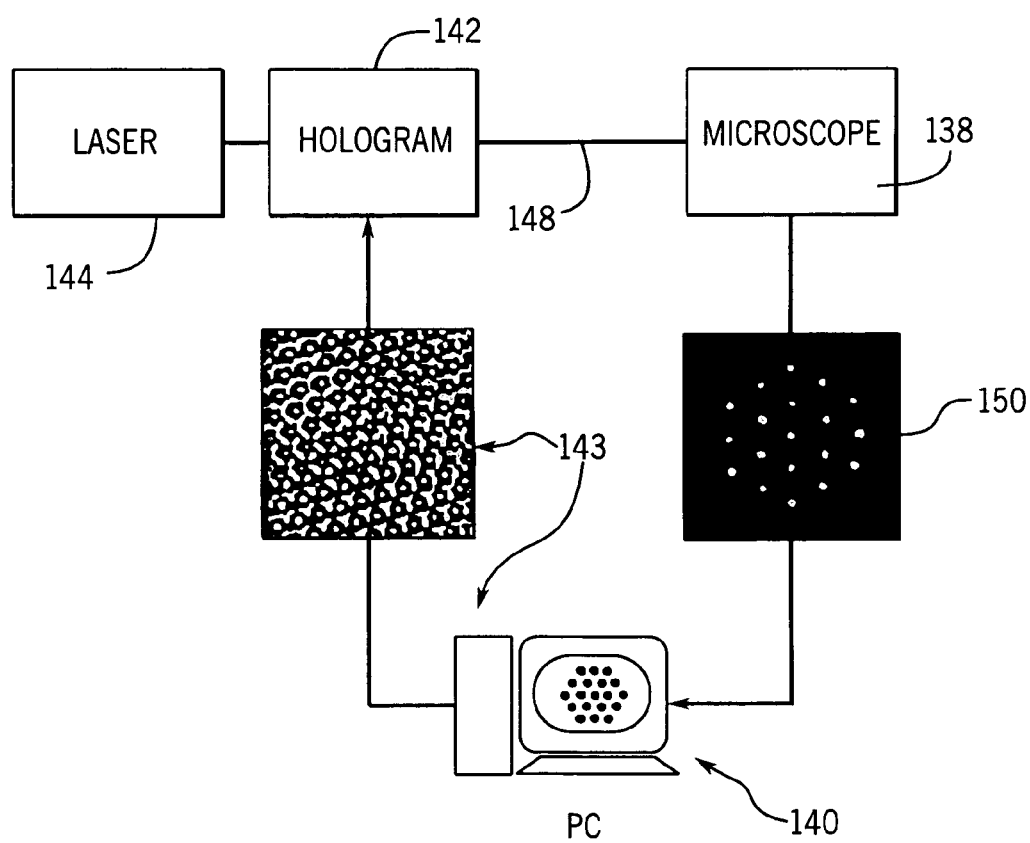
FIG. 10 illustrates an optical trap control system with microscope imaging.

In addition, in another process the particles 126 can be dynamically sorted by size. One can also image an array of the particles 126 in the manner shown in FIG. 10. A microscope 138 can image the particles 126, and a personal computer 140 can identify the particles 126 and calculate a phase only hologram 142 (for the diffractive optical element 144 of FIG. 8). To trap said particles, a computer controlled spatial light modulator 143 can then implement the computer designed hologram 142 by causing application of a pattern of phase modulations to the laser beam 144. This can also be dynamically varied for any of a variety of purposes. The modified laser beam 148 (also see the several laser beams 106, 108 in FIG. 8) are focused by the microscope 138 to create an array of the optical traps 132 (also known as tweezers) which traps the particles 126 for display on image screen 150. Each of the particles 126 can then be individually manipulated to assemble a desired structure to sort the particles 126 or to otherwise manipulate, inspect or alter the shape of the object of interest.

While preferred embodiments of the invention have been shown and described, it will be clear to those skilled in the art that various changes and modifications can be made without departing from the invention in its broader aspects as set forth in the claims provided hereinafter.

What is claimed is:

1. A method of controllably filling an array of small particles, comprising the steps of:
   providing a source of small particles;
   controlling a profile of a laser beam to provide a selected laser beam pattern for forming optical traps at particular locations in an array; and
   varying the profile of the laser beam over time to systematically fill the array in a predetermined manner, the array being a time varying array of the small particles at the location of the optical traps.

2. The method as defined in claim 1 wherein the step of varying the profile of the laser beam includes applying a diffractive optical element to the laser beam.

3. The method as defined in claim 2 wherein the diffractive optical element is provided by a computer.

4. The method as defined in claim 1 wherein the step of varying the profile of the laser beam includes applying a time varying holographic control signal to the laser beam.

5. The method as defined in claim 1 wherein the step of varying the profile of the laser beam includes the step of blocking a portion of the laser beam in a conjugate object plane.

6. The method as defined in claim 5 wherein the step of blocking the laser beam includes inserting a knife edge into the laser beam.

7. The method as defined in claim 1 wherein the step of providing a source of particles includes flowing the particles past exposed ones of the optical traps by applying a pressure differential.

8. The method as defined in claim 1 further including the step of permanently forming the array.

9. The method as defined in claim 8 wherein the step of permanently forming the array comprises at least one of (a) transferring the array onto a substrate and (b) gelling fluid which is suspended around the array.

10. The method as defined in claim 1 wherein the laser beam is dynamically reconfigured to change the array responsive to an optical requirement for a time varying array of the small particles.

11. The method as defined in claim 10 wherein the array's response to the optical requirement comprises at least one of (a) change of position of at least one of the optical traps, (b) strength and shape of at least one of the optical traps, (c) introduction of new optical traps and (d) removal of an existing one of the optical traps.

12. A method of controllably manipulating an array of optical traps, comprising the steps of:
providing a laser beam;
controlling a profile of the laser beam to provide a selected laser beam pattern for forming optical traps at particular locations; and
varying the profile of the laser beam over time to systematically fill the array in a predetermined manner, to form a time varying pattern of the optical traps.

13. The method as defined in claim 12 wherein the laser beam is dynamically reconfigured to change the optical traps responsive to an optical requirement.

14. The method as defined in claim 13 wherein the array of traps manipulates a biological medium for examination.

15. The method as defined in claim 14 wherein the step of manipulating includes controlling shape of an object.

16. The method as defined in claim 13 wherein the optical requirement involves image analysis.

17. The method as defined in claim 12 wherein the array's response to the optical requirement comprises at least one of (a) change of position of at lest one of the optical traps, (b) strength and shape of at least one of the optical traps, (c) introduction of new optical traps and (d) removal of an existing one of the optical traps.

18. The method as defined in claim 12 wherein the step of varying the profile of the laser beam includes activation/deactivation of a diffractive optical element.

19. The method as defined in claim 12 wherein the step of varying the profile of the laser beam includes applying a spatial light modulator to the laser beam.

20. The method as defined in claim 12 wherein the step of varying the profile of the laser beam includes deactivation of the laser beam at a conjugate plane.

21. The method as defined in claim 12 wherein the step of varying the profile of the laser beam includes applying a time varying holographic control signal to the laser beam.

22. The method as defined in claim 12 wherein the step of varying the profile of the laser beam includes a step of blocking a portion of the laser beam in a conjugate object plane.

23. The method as defined in claim 12 wherein the step of blocking the laser beam includes inserting a knife edge into the laser beam.

24. The method as defined in claim 12 further including the step of providing at least one particle to flow past at least one of the optical traps.

25. The method as defined in claim 12 further including the step of executing computer software to perform a manufacturing process involving manipulation of at least one object over a plurality of time and space positions.

26. An apparatus for controllably manipulating an array of optical traps, comprising:
a source for a laser beam;
means for controlling a profile of the laser beam to provide a selected laser beam pattern for forming optical traps at particular locations; and
means for varying the profile of the laser beam over time to systematically fill the array in a predetermined manner, to form a time varying pattern of the optical traps.

27. The apparatus as defined in claim 26 wherein the laser beam is dynamically reconfigured to change the optical traps responsive to an optical requirement.

28. The apparatus as defined in claim 27 wherein the optical requirement comprises a command sequence source providing instructions for manipulating a biological medium for examination.

29. The apparatus as defined in claim 28 wherein the means for manipulating includes a spatial light modulator.

30. The apparatus as defined in claim 27 wherein the optical requirement includes computer image inspection via executable computer analysis program.

31. The apparatus as defined in claim 26 wherein the array's response to the optical requirement comprises an executable computer program for performing functionalities of at least one of (a) change of position of at least one of the optical traps, (b) strength and shape of at least one of the optical traps, (c) introduction of new optical traps and (d) removal of an existing one of the optical traps.

32. The apparatus as defined in claim 26 wherein the means for varying the profile of the laser beam includes a device for activation/deactivation of a diffractive optical element.

33. The method as defined in claim 26 wherein the means for varying the profile of the laser beam includes a knife edge for blocking a portion of the laser beam in a conjugate object plane.

* * * * *